3,352,636
PROCESS FOR PRODUCING ALUMINA GEL
Charles P. Wilson, Jr., and Brownell Carr, Cincinnati, Ohio, and Frank G. Ciapetta, Silver Spring, Md., assignors to W. R. Grace & Co., New York, N.Y., a corporation of Connecticut
No Drawing. Filed July 9, 1964, Ser. No. 381,567
3 Claims. (Cl. 23—143)

This application is a continuation-in-part of application Ser. No. 310,848, filed Sept. 23, 1963, and now abandoned.

This invention relates to alumina gel. In one specific embodiment, it relates to a novel process for the manufacture of alumina gels having high porosity, high surface area and low compactive densities.

Hydrous alumina or alumina gel is generally formed by adding ammonia or an alkaline precipitating agent to a solution of a suitable salt such as aluminum sulphate. The precipitate is very voluminous and gelatinous. The gel often contains not over 10% alumina, the balance being water. In this form, it is the most reactive of the hydrous aluminas and combines with both acids and alkalis. The gel can be dried to a hard glass-like material and activated by heating. It has a high surface area which makes it useful as an adsorbent, or a catalyst support.

The porosity characteristics of the gel aluminas are dependent on the mode of preparation. Gel aluminas which have pore diameter distributed in the range of about 100 to 1500 angstrom units and a large percentage of the pore diameters in the range of about 120 to 1200 angstrom units are particularly desirable as supports for catalysts having certain specific areas of application.

We have found that an alumina gel having the proper pore size distribution can be prepared by the addition of sodium carbonate to an aluminum salt solution. The essential features of this process reside in the continuous co-mixing of approximately ⅔ of the total sodium carbonate with the aluminum sulphate solution prior to gelation. This was found to greatly reduce foaming in the gelatin step and thereby permit a considerable increase in the rate of production.

Another important feature of the present invention is the homogenization of the mixed sodium carbonate-aluminum sulphate solution prior to and during the gelation step. This homogenization improves product quality and facilitates processing.

A further improvement in this present process is derived from the use of fog nozzles or other dispersing equipment for the addition of sodium carbonate in the final gelation of the alum. The sodium carbonate is sprayed over the surface of the premixed sodium carbonate and alum. This practice has been found to reduce foaming and local pre-precipitation of the alumina prior to gelation.

After gelation, the alumina slurry is homogenized. Any suitable method of homogenization gives satisfactory results. However, homogenization is conveniently achieved in plant operation by impact homogenization. The homogenized slurry is then spray dried, wet collected and washed and redried.

The essence of the invention thus resides in the preparation of alumina gels having exceptionally high porosity. The pore volume may be determined in one of two ways. "Nitrogen" pore volume is measured by the techniques described in the article by S. Brunauer, P. Emmett and E. Teller, J. Am. Chem. Soc., 60, 309 (1938). This method depends on the condensation of nitrogen into the pores, and is effective for measuring pores with pore diameters in the range of about 10 to 600 angstrom units.

"Mercury" pore volume is measured by forcing mercury into the pores. The measurement of mercury pore volume was accomplished using a standard mercury porosimeter. The operation of this system is dependent on the fact that mercury can be forced into different sized pores depending on the pressure exerted. Thus, at 100 p.s.i. absolute pressure, mercury can be forced into pores having a diameter above about 17,500 angstroms. As the size of the pores decrease, the amount of pressure required to force mercury into the pores increases. This method is described in detail in the publication of Ritter, H. L. and Drake, L. C., Ind. Eng. Chem. Anal. Ed. 17, 787 (1945). The mercury pore volumes reported in the data in this application were measured at pressures from 0 to 15,000 p.s.i.a.

In the process of the instant application, the conditions are adjusted to provide a product with a mercury pore volume in the range of 2.0 to 3.7 cc./g., preferably 2.0 to 2.8 cc./g. The nitrogen pore volume (Brunauer-Emmett-Teller method) is in the range of 0.60 to 1.3 cc./g., preferably 0.70 to 0.90 cc./g. As a rule the nitrogen pore volume must be above 0.65 cc./g. to give the preferred mercury pore volume of 2.0 to 2.8 cc./g. The product has an activated compacted density in the range of 15 to 25 pounds per cubic foot, preferably 16 to 20 pounds per cubic foot.

The first step of the preparation of the product of the instant application is the preparation of an aluminum salt solution. This solution is prepared to contain 65 to 100 grams per liter of aluminum oxide. About two-thirds of the amount of sodium carbonate solution containing 5 to 15% $Na_2O$ needed to gel the alumina is co-mixed with this aluminum sulphate solution to give a solution with a pH of 3.95. In the next step of the process, the partially neutralized mixture is discharged into any suitable equipment to allow release of some of the carbon dioxide being evolved and prevent foaming in the subsequent step. The mixture of aluminum sulphate and sodium carbonate is then transferred to a suitable gelation vessel where the balance of the sodium carbonate needed for the gelation of the alumina from the aluminum sulphate solution is added as a fine dispersion. In a plant process, the use of fog nozzles to add the balance of the sodium carbonate prevents excessive foaming and pre-precipitation of the alumina from the alum solution.

After gelation, the alumina slurry is homogenized. Any suitable method of homogenization can be used. In plant production, excellent result were achieved using impact homogenization. This was accomplished by pumping the aluminous slurry from the bottom of the gelation tank and discharging this slurry with great impact against the bottom of a barrier such as a trough positioned above the gelation tank. This homogenization results in numerous improvements of the process and product. Impact homogenization lowers the final product density and at the same time increases the nitrogen and mercury pore volumes.

One of the problems encountered in the prior processes for preparing this alumina from the sodium carbonate has been the fact that the pH of the aluminous slurry dropped during spray drying. The use of impact homogenization in the process of the instant application greatly reduced this tendency. In the absence of homogenization, for example, the pH of the aluminous slurry would drop from 5.7 in the spray drier feed to about 4.5 for the spray dried product. In the present process, this decrease in pH during spray drying is relatively small. For example, a spray drier feed that had a pH of 5.8 would emerge from the spray drying step with a pH of about 5.5.

This small change in pH during spray drying permitted important improvements in the control of product density and pore size. Another important improvement of the product that can be attributed to the homogenization technique is the fact that the spray dried aluminous slurry can be wet collected. When the aluminous slurry was prepared without homogenization, the spray dried product, when wet collected, had a tendency to peptize and, therefore, had to be cooled prior to reslurrying with the wash water. In commercial operation, any cooling step is a costly operation and should be avoided whenever possible.

The desired results in the process of the present application are accomplished only if the homogenization step is carried out prior to spray drying of the final product.

Since the primary use of alumina gels of our invention is for catalyst supports, the sodium content of the final product must be held below about 0.05 weight percent. In order to facilitate removal of the sodium during the washing of the spray dried product, it is preferred that the maximum pH of the hydrous alumina gel slurry prior to the spray drying step, be between about 5.4 to 6.0. This control of pH is critically important, as pointed out previously.

In the next step of our process, the alumina gel product is spray dried. After the spray drying, the product is washed with any suitable solvent to remove the sodium and sulfate to suitably low levels. Good results are obtained with washes of water that have been passed through a cation exchange resin bed to remove the cations, followed by washes with ammonium sulfate solution and/or ammoniacal water solution. The ammonium sulfate washes are preferably carried out using a 2° Baumé ammonium sulfate solution. After the wash with the ammonium sulfate solution, it is preferred to wash the alumina with decationized water adjusted to a pH of about 9.0 to 9.5 with ammonia.

In the final step of the process of our invention, the product is dried by flash drying.

The invention is further illustrated by the following specific but non-limiting examples.

EXAMPLE 1

This example illustrates a method of preparing an alumina having the desired pore volume and density characteristics.

An aluminum sulfate solution was prepared to contain 7.05% $Al_2O_3$ and 20.06% sulfate. The solution was heated to 86° F. and was pumped through a mixing device at the rate of 66 gallons per minute. A sodium carbonate solution prepared to contain 10.2% $Na_2O$ was also pumped through the same mixing device at a rate such that the pH of the mixture was about 3.95. The effluent from the mixing device was discharged into a trough two feet wide, two feet deep and six feet long, prior to being added to the main gelation tank. This step was found to greatly reduce foaming in the gelation tank and thus greatly increase the rate of production.

The amount of sodium carbonate added in this step of the process represented 66% of the amount required for neutralization of the aluminum sulfate (alum) solution. This solution was pumped through the mixing device and into the gelation tank until 1850 gallons of the alum solution was added to the gelation tank. At this stage, the contents in the gelation tank was continuously circulated by means of a centrifugal pump. The slurry was discharged from the centrifugal pump into the trough described previously. Soda ash addition was continued using "Beta" fog nozzles until gelation of the aluminum sulfate occurred at a pH of about 4.5. After gelation of the hydrous alumina, the addition of sodium carbonate was continued until the pH was 5.8. A total of 2240 gallons of sodium carbonate solution was required for the neutralization and pH adjustment of the 1850 gallons of alum solution.

Impact homogenization through circulation using a centrifugal pump was continued until the product appeared to be homogeneous. The aluminous slurry was spray dried in a commercial spray drier operated at a product temperature of 375 to 400° F. The dried product discharged from the drier was wet collected. The analysis of the spray dried product was as follows:

Table I

| | Percent |
|---|---|
| $Al_2O_3$ | 18.96 |
| $Na_2O$ | 26.75 |
| $SO_4$ | 51.64 |
| Total volatiles (after heating to 1750° F.) | 8.21 |

The product was reslurried with water. The pH of the wet collected material 5.5. The product was washed three times with decationized water. The wash was carried out using 8.6 gallons of water heated to a temperature of 110° F. per 2.1 gallons of alumina. This wash was followed by four washes with decationized water adjusted to a pH of 9.5 with ammonia and heated to a temperature of 140 to 160° F. The washed filter cake was reslurried with water and finally spray dried to give a product giving the following physical and chemical analysis:

Table II

Chemical analysis in percent (dry basis):
  $Na_2O$ _____ 0.026
  $SO_4$ _____ 0.28
Total volatiles (1750° F.) _____ 23.22
Physical analysis.—Percent retained on
  200 mesh screen _____ 1.0
  270 mesh screen _____ 2.0
Surface area in $m^2$g. and pore volume in cc./g. after calcination for 3 hours at 1000° F.:
  Nitrogen pore volume _____ 0.86
  Mercury pore volume _____ 2.75
  Surface area _____ 332
Compacted density (pounds per cubic foot) _____ 16.9

The compacted density of the product of this example and the following example was determined by heating the washed and dried product for 3 hours at 1000° F. After cooling 100 grams of the product was transferred to a 250 ml. cylinder and compacted (using a conventional Ro-Tap machine) for 30 minutes. The volume was then measured and the compacted density calculated using the formula $$D = \frac{M}{V}$$

where M represents the weight of the sample and V is the volume after compacting.

The nitrogen and mercury pore volumes were determined on samples after activation for 3 hours at 1000° F.

EXAMPLE 2

The importance of impact homogenization was demonstrated in a run in which the conditions were the same as in Example 1, except the impact homogenization was omitted.

In this run, the aluminum sulphate solution contained 7.05% $Al_2O_3$ and 20.06% $SO_4$. The aluminum sulphate solution was mixed with that quantity of 10.2% sodium carbonate solution that is equivalent to 66% of the theoretical amount needed to neutralize the aluminum sulphate. The other steps of the process were the same with the exception that the homogenization by circulation into the trough was omitted. The aluminous slurry recovered from the run was not homogenous and quite lumpy in appearance. This product was spray dried but could not be wet collected because it peptized on coming in contact with water used in the wet collector. The peptization gave a slurry in which the hydrous alumina gel would not settle and washing was very difficult because the finely divided peptized alumina blinded the filter cloth.

Another distinguishing feature of this product was the substantial drop in pH on spray drying from 5.7 in the slurry to 4.9 in the product. This drop was not noted when the product was homogenized using the technique in Example 1. The pore volume and compacted density were determined on this sample.

The product had a nitrogen pore volume of 0.60 and a mercury pore volume of 1.05. The compacted density of this product was 22.9 pounds per cubic foot.

A comparison of these data with the density and pore volume data presented in Table II shows the product recovered when the impact homogenization step was omitted does not have the desirable characteristics of the product of Example 1.

Obviously, many modifications and variations of the invention may be made without departing from the essence and scope thereof and only such limitations should be applied as are indicated in the appended claims.

What is clamed is:

1. A process for preparing alumina gel having a mercury pore volume in the range of 2.0 to 3.7 cc./g. and pore diameter in the range of 100 to 1500 angstroms, which consists in preparing a soluble aluminum salt solution containing about 65 to 100 g./l. of alumina and selected from the group consisting of the chloride, the nitrate and the sulphate, contacting said solution in a mixing device with sufficient sodium carbonate solution to increase the pH to about 3.95, partially evolving $CO_2$ from the partially neutralized slurry, gelling the slurry by increasing the pH in a second stage neutralization to about 5.4 to 6 by adding further sodium carbonate as a fine dispersion, homogenizing the resulting alumina gel slurry, maintaining the pH at about 5.4 to 6 and spray drying the slurry, thereafter wet collecting the product, washing, drying and recovering the product.

2. A process according to claim 1 wherein the homogenization is carried out by impact homogenization and the second stage neutralization is effected by the use of fog nozzles to add the sodium carbonate as a fine spray.

3. A process according to claim 1 wherein the aluminum salt solution contains about 65 to 100 grams per liter of alumina and the sodium carbonate solution contains about 5 to 15% $Na_2O$.

References Cited
UNITED STATES PATENTS

| | | | |
|---|---|---|---|
| 2,913,400 | 11/1959 | Burton et al. | 23—143 X |
| 3,024,088 | 3/1962 | Palmquist et al. | 23—143 |
| 3,055,737 | 4/1962 | Wilson et al. | 23—143 |
| 3,066,012 | 11/1962 | Wilson et al. | 23—143 |
| 3,086,845 | 4/1963 | Malley et al. | 23—143 |
| 3,202,480 | 8/1965 | Nixon | 23—143 |

OSCAR R. VERTIZ, *Primary Examiner.*

H. T. CARTER, *Assistant Examiner.*